Oct. 4, 1960 E. W. J. CADDY 2,954,981

AUTOMATIC RECORD CHANGING GRAMOPHONES

Filed Jan. 30, 1958 4 Sheets-Sheet 1

INVENTOR
Edward William John Caddy
by Davis Hoxie
his attorney

Oct. 4, 1960 E. W. J. CADDY 2,954,981

AUTOMATIC RECORD CHANGING GRAMOPHONES

Filed Jan. 30, 1958 4 Sheets-Sheet 2

INVENTOR
Edward William John Caddy
by [signature]
his attorney

Oct. 4, 1960 E. W. J. CADDY 2,954,981
AUTOMATIC RECORD CHANGING GRAMOPHONES
Filed Jan. 30, 1958 4 Sheets-Sheet 3

INVENTOR
Edward William John Caddy
by [signature]
his attorney

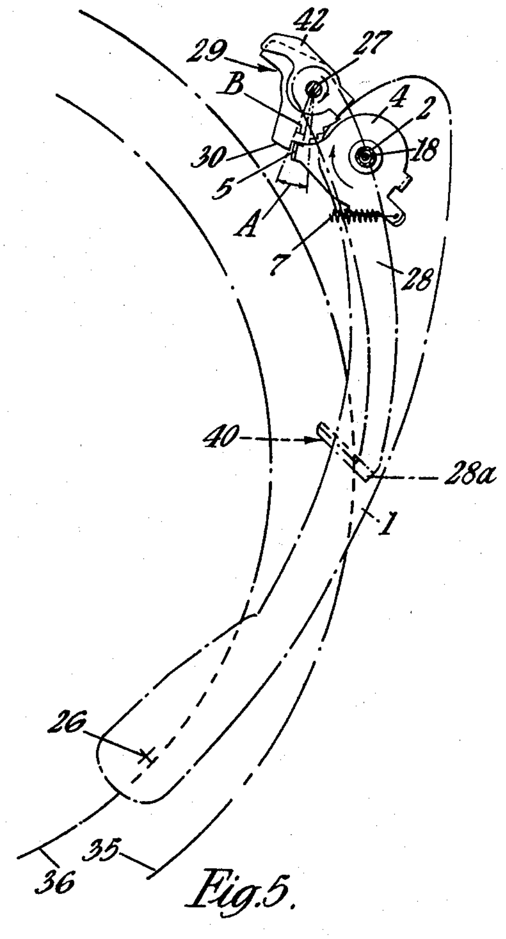
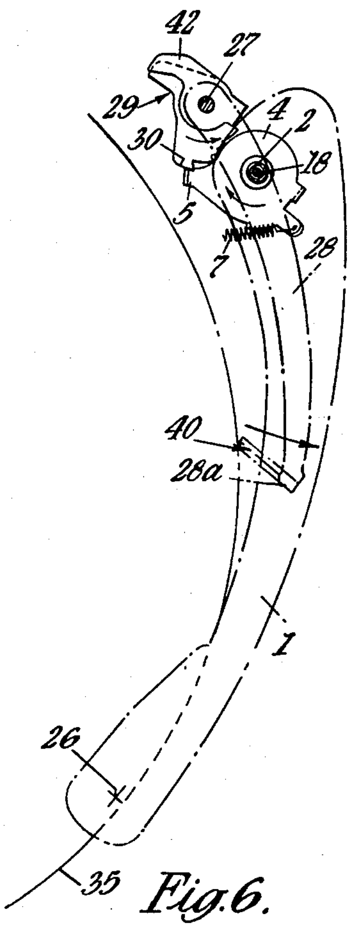
INVENTOR
Edward William John Caddy
by [signature]
his attorney United States Patent Office 2,954,981

Patented Oct. 4, 1960

2,954,981

AUTOMATIC RECORD CHANGING GRAMOPHONES

Edward William John Caddy, Swindon, England, assignor to The Garrard Engineering and Manufacturing Company Limited, Swindon, England Filed Jan. 30, 1958, Ser. No. 712,235

Claims priority, application Great Britain Jan. 31, 1957

8 Claims. (Cl. 274—10)

Figure 1:
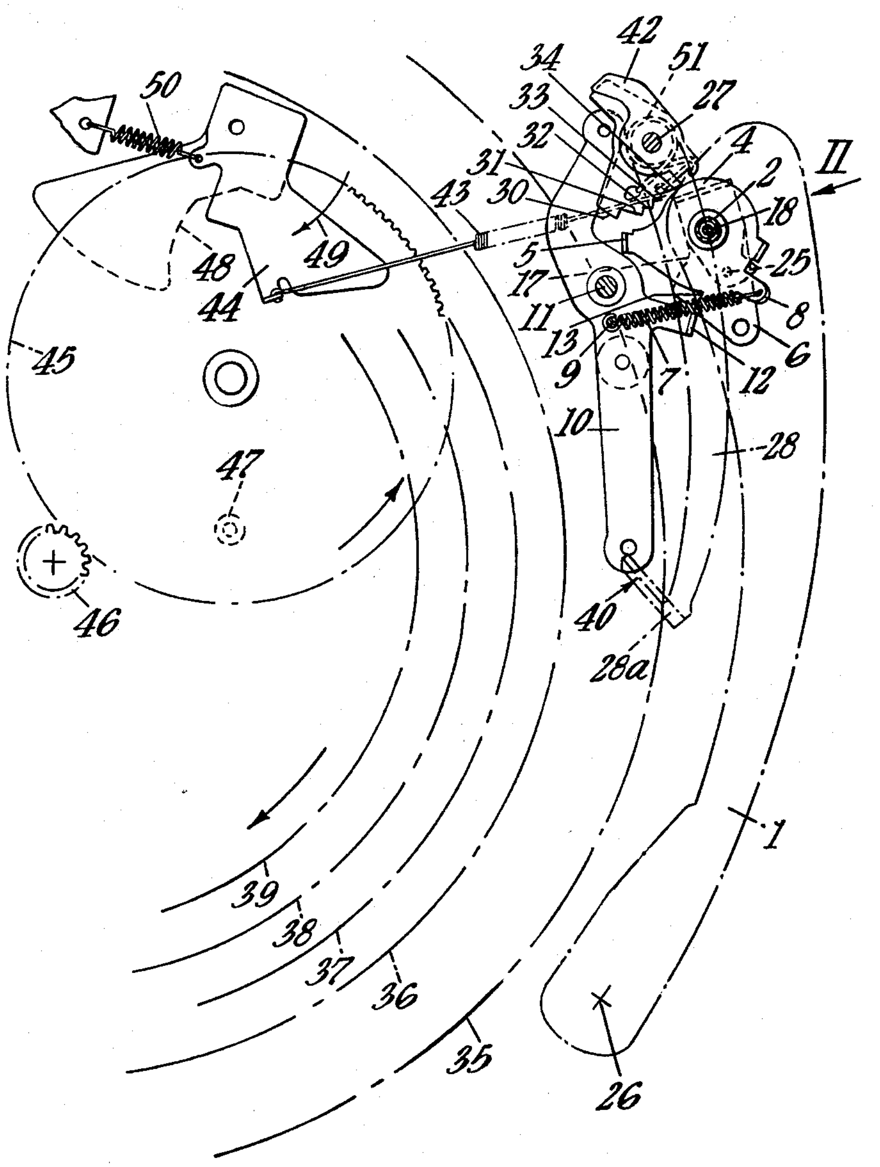

This invention relates to automatic record changing phonographs of the type wherein records to be played are stacked in the horizontal plane at an elevated position above the turntable on a vertically extending centre spindle from which stack they are caused to drop one by one to the turntable for playing. Automatic record changers of this type can be used for playing all sizes (diameters) of records from 7 inch, for example, up to 12 inch and in order to ensure that the pick-up stylus drops correctly on to the commencement groove of each record whatever its size, record size gauging means are provided which detect the size (radius) of the record next to be played and adjacent the dropping position of the pick-up arm accordingly.

One form of record size gauging means comprises a horizontal gauge arm carried on a vertical shaft, located at a point beyond the periphery of the turntable, so as to be swingable towards the record stack and having an upstanding record-stack contacting abutment at its free end by which the arm is arrested against the periphery of the stacked records thereby locating stop means, coupled to the vertical shaft of the horizontal arm beneath the machine base-board, in a position to be contacted by means connected to the pick-up arm so as to arrest the inward movement of the pick-up arm directly above the commencing groove of the record to be played. It is to automatic record changers having the inswinging horizontal arm record size gauging means that the present invention specifically relates.

Record changing phonographs of the type set forth having record size gauging means of the character set forth cannot play alternately mixed-sized records e.g. alternating 10 inch and 12 inch records, with correct dropping of the pick-up for the smaller records, since the larger records obstruct the swing arm of the gauging means from contacting the peripheries of the smaller records; it is however possible to play a stack of two different sized records provided all the small size records are stacked together above all the larger size records, e.g. all the 10 inch above all the 12 inch records.

It is an object of the present invention to provide an automatic record changing phonograph of the type set forth having record size gauging means of the character set forth which enables alternately arranged mixed sized records (e.g. 10 inch and 12 inch alternating or random stacked records) to be played with correct dropping of the pick-up stylus for both record sizes.

It is a further object of the present invention to provide an automatic record changing phonograph of the type set forth having record size gauging means of the character set forth, according to the preceding paragraph, in which the record size gauging means also operates to gauge other sizes of record, e.g. 7 inch, 8 inch or 9 inch records, provided these other sizes of record are placed on top of the stack of mixed-size larger records as a group or in groups of descending size. For example, according to the present invention, it is possible to play 12 inch and 10 inch records alternately mixed, with one or more 9 inch, 8 inch and/or 7 inch records stacked on top in that order.

The invention consists in an automatic record changing phonograph of the type set forth having record size gauging means of the character set forth wherein the swingable gauge arm of the gauging means has the stop means adapted so that whether the swinging arm engages the periphery of a larger or smaller diameter record on the stack, viz. a 12 inch or a 10 inch record, the stop means is contacted by the means on the pick-up arm to arrest the arm in the smaller diameter (10 inch record) dropping position, and wherein the end of the swinging arm is provided with cam shaped ramp means adapted to be engaged by a larger diameter record (12 inch record) and displaced together with the swinging arm, as the record drops, to cause the stop means to be located in a position to be contacted by the means on the pick-up arm to cause the latter to be arrested in the larger diameter (12 inch record) dropping position, the ramp means being so formed or arranged, as regards records smaller than the largest size, that the position of the stop means, after gauging of such smaller records, is not further effectively influenced by the dropping of any such smaller sized record, viz. not further influenced by 10 inch, 9 inch, 8 inch, or 7 inch records in the act of dropping.

The invention further consists in an automatic record changing phonograph of the type set forth having record size gauging means of the character set forth, according to the preceding paragraph, wherein on no records being stacked on the vertical spindle (i.e. if no records are on the phonograph or if all of a stack of records have been played), the gauge arm, being unobstructed by any record swings in to actuate means which prevent the pick-up arm from being swung and dropped and to initiate stopping of the phonograph motor.

Figure 2:
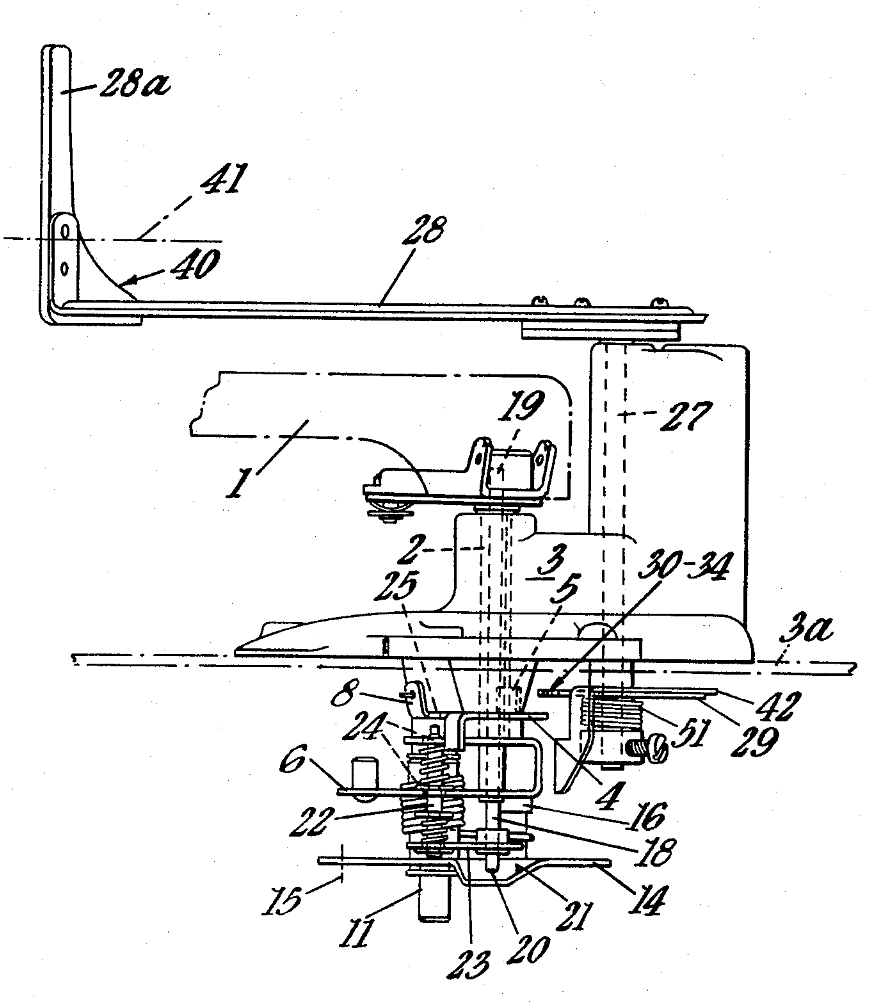

In the accompanying drawings:

Figure 1 is a plan view of part of an automatic record changing phonograph of the type indicated, with the parts below the baseboard shown in full lines and the parts above, viz. the pick-up arm and record size gauging means, in broken lines, Figure 2 is an elevation taken in the direction of the arrow II in Figure 1 of part of the mechanism, and Figures 3 to 6 are fragmentary plan views, similar to Figure 1, of the mechanism in various positions of operation.

In carrying the invention into effect according to one mode by way of example, an automatic record changing phonograph of the type set forth has a pick-up arm 1 carried on vertical hollow shaft 2 which is journalled in a mounting unit 3 secured to the baseboard *3a* (see Figure 2) of the phonograph. Beneath the baseboard *3a*, a member 4 having an arm 5 projecting substantially radially of the shaft 2 is journalled on the shaft 2 so as to permit rotation of the shaft 2 with respect thereto when necessary as described hereafter. The pick-up arm shaft 2 also has the usual ancillary mechanisms for effecting raising and lowering, tracking and the like of the pick-up arm 1.

Briefly the ancillary mechanisms comprise (see Figures 1 and 2) a U-shaped lever 6 secured to the hollow shaft 2; a spring 7 coupled to a lug 8 on the member 4 and anchored at 9 to the baseboard *3a* so as to load the member 4 to rotate in a clockwise direction as viewed in Figure 1; a tripping lever 10 (Figure 1 only) pivoted to the baseboard on a shaft 11 and having a projection 12 engageable with a detent 13 on the member 4 so that when engaged the member 4 is restrained against said clockwise rotation; a cam disc 14 (Figure 2 only) also mounted on the shaft 11 and to semi-rotate by means of a link (not shown) coupled at 15 to the cam disc 14 and movable by rotating control cam means (not shown) of known character for effecting synchronised movements of the pick-up arm and record-dropping mechanism (not shown); a boss 16 on the cam disc 14 adapted to engage and move along the edge 17 of the U-shaped lever 6 for the purpose described below; a post 18 located in the bore of the hollow spindle 2 engaging at its top end 19 an abutment (not shown) on the pick-up arm 2 and at its lower end 20 the cam surface 21 of the cam disc 14 so that movement of the cam disc 14 causes reciprocatory movement of the post 18 to raise and lower the pick-up arm 2 in known manner; and a displaceable locking bolt 22 carried by an arm 23 secured to the post 18 and passing through holes 24 in the arms of the U-shaped lever 6 and adapted to enter for locking purposes as described below a hole 25 in the member 4 so as to lock the member 4 to the U-shaped lever 6, and therefore to the pick-up arm shaft 2, during the required part of the pick-up arm tracking cycle described below.

The above ancillary mechanisms inter-operate as follows: raising and lowering of the pick-up arm 1 is effected by movement of the cam surface 21 under the end 20 of the post 18 and an upward movement of the post 18 (raising the pick-up arm 2) causes the locking bolt 22 to lock the member 4 to the U-shaped lever 6 and therefor to the pick-up arm shaft 2 so that whenever the pick-up arm is raised (i.e. above the level of the record or the topmost record on the turntable) and is either tracking inwards to play a record or is tracking outwards at the end of a record playing cycle, the member 4 is in effect locked to the pick-up shaft 2 for the purpose described hereafter; inward tracking of the pick-up arm 1 is effected by the spring 7 pulling on the lug 8 of the member 4 whenever the member 4 is locked to the shaft 2 by the locking bolt 22 (as described above) and is freed for rotation by the removal of the projection 12 on the tripping lever 10 from the detent 13 on the member 4; outward or return tracking of the pick-up arm 1 is effected by the boss 16 on the disc-cam being displaced as the cam is rotated and engaging the edge 17 of the U-shaped lever 6 to cam the lever 6 in an anti-clockwise direction as viewed in Figure 1 (the disc-cam 14 and boss 16 have been omitted from Figure 1 for clarity).

In order to cause the pick-up arm 1 to swing inwards so that it is lowered exactly on or closely adjacent the commencement groove of the next record to be played, a record size gauging means is provided of the general character mentioned above and is responsible, by gauging the size of the next record, for limiting the extent of the inward swing of the pick-up arm 1 so that when the stylus, the location of which is indicated at 26, is lowered it engages the commencement groove of the record.

The record size gauging means is mounted adjacent to the pick-up arm mounting and comprises a vertical shaft 27 journalled in the mounting unit 3. The shaft 27 carries at its upper end a swingable gauge arm 28 having a record-engaging abutment **28*a* at its tip, and at its lower end is attached a stepped stop member indicated at 29 located in the plane of movement of the projecting arm 5 on the member 4 on the pick-up arm shaft 2, so as to be contacted by the projecting arm 5** as described hereafter.

The stepped stop member 29 has a plurality of steps 30, 31, 32, 33 and 34 angularly spaced about the centre of the swinging arm shaft 27 and correspond in number to the number of different record sizes which the phonograph is to accommodate, e.g. for playing 12 inch, 10 inch, 9 inch, 8 inch and 7 inch records, shown on Figure 1 and Figures 3 to 6 as references 35, 36, 37, 38 and 39 respectively, there are, as shown, the five steps 30–34. Each step 30–34 is arcuate in profile and concentric with the axis of the shaft 27 but spaced a different radial distance from the axis, the spacing distance of the step 34 corresponding to the smallest size record (e.g. 7 inch) being the shortest and that of the step 30 corresponding to the largest size record (e.g. 12 inch) being the longest.

By the above arrangement, when the swingable gauge arm 28 of the record size gauging means is swung in towards the stack of records on the centre spindle of the turntable, as described hereinafter, the stop member 29 is caused to pivot with the swingable arm shaft 27 and so displace the steps 30 to 34 thereon with respect to the path of movement of the projecting arm 5 on the member 4 on the pick-up shaft 2 traced when the pick-up arm 1 is swung inwardly by the ancillary mechanism described above. According to the size of record the periphery of which the end of the swingable gauge arm 28 engages to arrest the swingable gauge arm, so the appropriate step 30 to 34 on the stop member 29 is located on the path of movement of the projecting arm 5 on the pick-up shaft 2, so that the in-swinging pick-up arm 1 is arrested correctly over the commencement groove of the record next to be played.

Figures 3, 4:
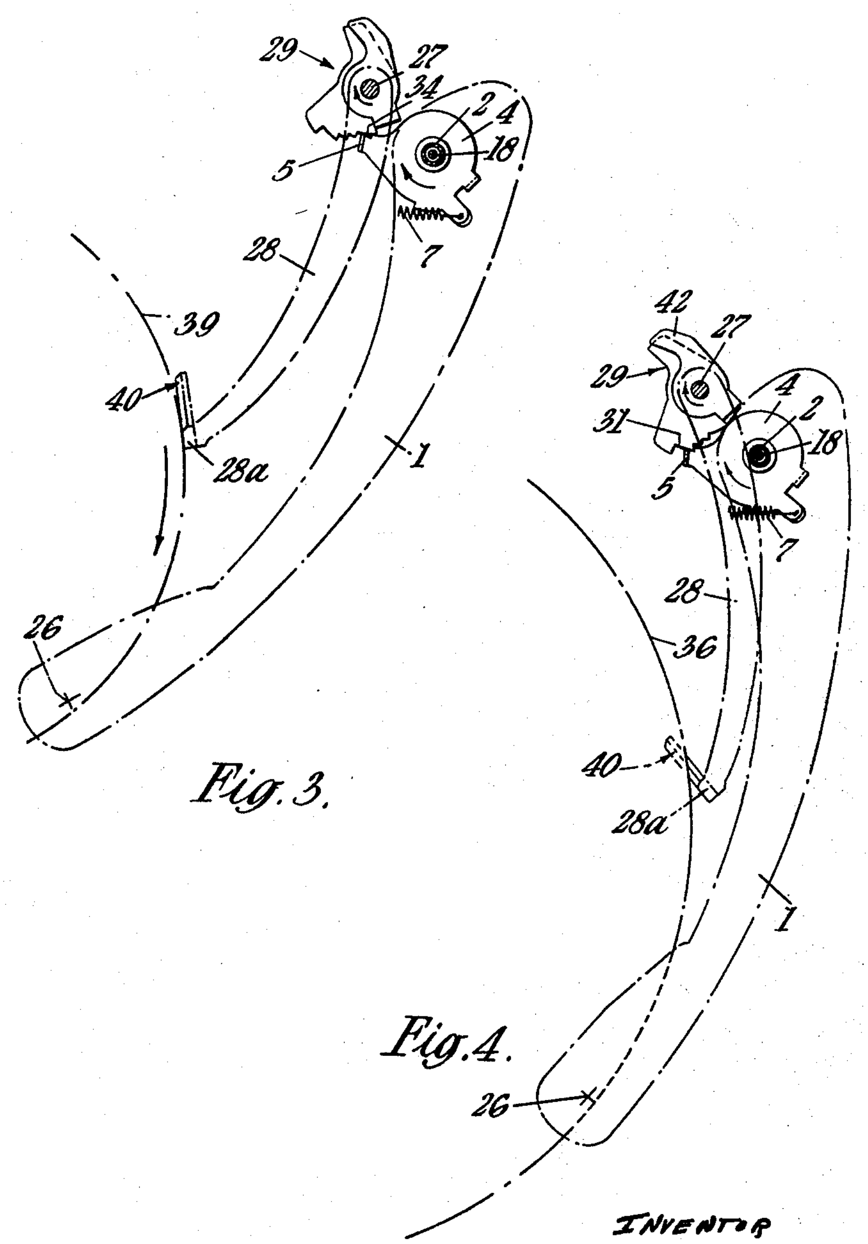

In Figure 3 of the drawings, a 7 inch record 39 is shown accessible for contact by the abutment **28*a* on the gauge arm 28 which has swung in to locate step 34 on the stop member 29 in the path of the projecting arm 5 on the member 4 on the pick-up arm shaft 2 so that the stylus 26 engages the record correctly at its commencement groove. Similarly in Figure 4, a 10 inch record 36 is shown accessible to the abutment 28*a* so that the gauge arm 28 locates step 31 in the path of the projecting arm 5 to provide correct engagement of the stylus 26 on the commencement groove of the record. For 8 inch and 9 inch records (not specifically illustrated) the operation is similar to locate steps 32 and 33 respectively in the path of the projecting arm 5**.

In order, however, to enable alternately mixed large and small diameter, 12 inch and 10 inch records, 35 and 36, to be correctly played, the step 31 on the stop member 29 corresponding to the smaller diameter, viz. 10 inch, record 36 has an arcuate extent A (see Figure 5) which covers the angular extent B which would, in normal sequence, be occupied by the step corresponding to the larger, viz. 12 inch record, and the 12 inch record step 30 is angularly displaced by the amount of angle B. By this arrangement whether the abutment **28*a* of the gauge arm 28 of the size gauging means engages a large or a small record, that is, a 12 inch or a 10 inch record, on the stack the step 31 corresponding to the correct 10 inch record dropping position of the pick-up arm 1 is disposed in the path of the projecting arm 5 on the pick-up shaft 2. So that even if a 10 inch record underlies a 12 inch record on the stack, the pick-up arm 1 will drop correctly on the 10 inch record commencement groove. See Figure 4 where the projecting arm 4 has engaged one end of the step 31 when a 10 inch record 36 has been engaged by the gauge arm 28 and has been dropped to the turntable for playing, and Figure 5 where the projecting arm 4 has engaged the other end (angular extent B) of the step 31 when a 12 inch record 35 overlying a 10 inch record 36 has been engaged by the gauge arm 28, but the underlying 10 inch record 36 has been dropped to the turntable for playing. Additionally, however, to enable correct pick-up arm engagement for a 12 inch record, which is engaged and dropped to the turntable for playing (see Figure 6) the abutment 28*a* of the gauge arm 28 is formed with cam means in the form of an inclined ramp surface 40 (see also Figure 2) extending downwardly a short distance below the level 41 of the lowermost record on the stack such that a 12 inch record 35 on dropping engages the ramp surface 40 of the abutment 28*a* and forces it away from the turntable centre (i.e. anti-clockwise as viewed in Figure 6) causing the gauge arm 28 and stop means 29 to pivot by a distance substantially equal to the lead of the ramp surface 40 and so locate the step 30 on the stop member 29 corresponding to the 12 inch record in the path of the projecting arm 4 on the pick-up shaft 2 so that the stylus 26** drops correctly on the commencement groove of the 12 inch record.

The abutment **28*a*** is laminar in structure and set with regard to the ramp surface 40 and the gauge arm 28 on which it is mounted so that its laminar plane is principally presented to records smaller than 10 inches in diameter, viz. 9 inch records and below, so that the camming effect of the ramp surface 40 is to a large extent obviated during dropping of these smaller records. The minor camming action when a 10 inch record is dropped (see Figure 4) is accommodated by the increased angular extent A of the step 31 as mentioned above.

In order to effect the initial in-swinging of the gauge arm 28 of the record size gauging means, while permitting the arm to be free for rearward (out-swinging) displacement (anti-clockwise as viewed in Figure 1) by the dropping of a 12 inch record producing a camming action on the ramp surface 40 of the gauge arm 28 described above, the stop means 29 (or means 42 associated therewith and described hereafter) are coupled by a link, preferably a light coil spring 43, to a pivotal lever 44 mounted on the baseboard adjacent the normal record-changing cycling means of the phonograph comprising the rotary cam means (not shown) responsible for cycle timing and actuation, which cam means is rotated by a spur gear 45 driven from a pinion 46 which rotates is known manner when the turntable is driven round. The spur gear 45 has a post 47 thereon which orbits with the spur gear 45 and is disposed so as to strike the shaped surface 48 of the pivotal lever 44 and displace in the direction of the arrow 49 at the moment the in-swing of the gauge arm 28 of the gauging means is required to occur, so that through the link spring 43 connected to the stop member 29 (or associated means 42) the movement of the pivotal lever 44 is communicated to the gauge arm 28. Since the lever 44 is mounted for free pivoting it is restrained against swinging in the direction opposite to the arrow 49 by a light spring 50.

Since the relative angular positions of the gauge arm 28 and the steps 30 to 35 on the stop member 29 is critical, it is preferable not to mount the stop member 29 direct on the gauge arm shaft 27 since a force applied to the gauge arm 28 might strain or move the mechanism out of its critical setting. To this end the associated member 42, mentioned above, is secured to the shaft 27 and the stop member 29 freely mounted on the shaft 27, the stop member 29 being however effectively fixed with respect to the associated member 42 and the shaft 27 for light loads or forces by a strong coil spring 51 which effectively hold the stop member 29 and associated member 42 together.

When no records are on the phonograph or no records remain stacked on the turntable spindle, the above described pivotal lever 44 causes, on further cycling of the spur gear 45, the gauge arm 28 to swing inwardly, but the absence of records for it to engage causes it to be moved inwardly to an extent which causes it to actuate means (not shown) which in well known manner prevent further operation of the pick-up arm and turn off the phonograph motor.

I claim:

1. In an automatic record changer including a turntable, means for supporting a stack of records above the turntable, and a tone arm movable laterally over the turntable for engagement of a stylus with the commencement groove of a record released from the supporting means onto the turntable; the improvement comprising record size determining means including a gauge arm movable laterally over the turntable and having an end engageable with records on said supporting means; abutment means movable with said tone arm along a path of movement during inward movement of the tone arm laterally over the turntable; stop means movable with said gauge arm selectively into such path of movement of said abutment means for engagement by the latter to limit the inward movement of said tone arm in accordance with the size of a record engaged by said end of said gauge arm; there being a respective stop means for each size record, and the stop means for the second largest record being so positioned when said gauge arm engages either the largest or the second largest record of said stack; and cam means on said gauge arm end engaged by the largest record, in its movement toward the turntable, to displace said gauge arm to position the stop means for the largest record in the path of said abutment.

2. An automatic record changer as claimed in claim 1 in which said cam means is formed as a vertically extending cam surface on said gauge arm end disposed in operative relation to the edge of the largest record.

3. An automatic record changer as claimed in claim 1 in which said gauge arm is secured to a vertical shaft forming a pivoting axis for said gauge arm; said stop means comprise circumferentially extending consecutive steps on a stop member on said shaft at differing radial distances from the axis of said shaft; and the step for the second largest record having an angular extent substantially twice that of the other steps.

4. An automatic record changer as claimed in claim 2 in which said cam means is formed as a vertically extending cam surface on said gauge arm end disposed in operative relation to the edge of the largest record.

5. An automatic record changer as claimed in claim 4 in which said stop member is movable relative to said shaft; a second member secured to said shaft; and spring means interconnecting said stop and second members and biasing said stop member to move with said second member.

6. An automatic record changer as claimed in claim 4 in which said abutment means is a lock arm engageable with said steps and pivotal on the mounting shaft for said tone arm; and releasable lock means associated with said arm and effective to lock said lock arm to said mounting shaft during inward lateral movement of the tone arm.

7. An automatic record changer as claimed in claim 4 including a pivoted lever; a spring connecting said lever to said stop member; and a projection included in the cycle timing means of the record changer and engageable with said lever to swing said gauge arm inwardly.

8. An automatic record changer as claimed in claim 4 in which said cam surface is concave with respect to the edge of the largest record and has a lower end projecting beneath the latter when engaged therewith.

References Cited in the file of this patent

UNITED STATES PATENTS

| | | |
|---|---|---|
| 2,333,414 | De Tar | Nov. 2, 1943 |
| 2,752,159 | Bacher | June 26, 1956 |